United States Patent
Chiba et al.

[11] Patent Number: 5,955,811
[45] Date of Patent: Sep. 21, 1999

[54] ELECTROMAGNETIC ROTARY MACHINE HAVING MAGNETIC BEARING

[75] Inventors: Akira Chiba, 1-8-14-707, Shimoochiai, Shinjuku-ku Tokyo; Tadashi Fukao, 24-45, Matsukazedai, Aoba-ku, Yokahama-shi Kanagawa; Yasushi Maejima, Narashino, all of Japan

[73] Assignees: Akira Chiba; Tadashi Fukao; Seiko Instruments Inc., all of, Japan

[21] Appl. No.: 08/598,375

[22] Filed: Feb. 8, 1996

[51] Int. Cl.[6] .......................... H02K 17/16; H02K 17/42
[52] U.S. Cl. .................. 310/211; 310/90.5; 310/179; 310/114; 310/254; 310/258; 310/261
[58] Field of Search .................................... 310/211, 254, 310/90.5, 261, 179, 258, 114

[56] References Cited

U.S. PATENT DOCUMENTS

| | | | |
|---|---|---|---|
| 3,597,646 | 8/1971 | Lawrenson | 310/166 |
| 3,678,436 | 7/1972 | Herdrich et al. | 335/284 |
| 3,679,924 | 7/1972 | Menzies | 310/163 |
| 3,721,844 | 3/1973 | Fong | 310/166 |
| 3,883,633 | 5/1975 | Kohler | 310/152 |
| 4,185,216 | 1/1980 | Mole et al. | 310/178 |
| 4,393,344 | 7/1983 | Whellams | 318/759 |
| 4,490,638 | 12/1984 | Lind | 310/269 |
| 4,761,602 | 8/1988 | Leibovich | 318/816 |
| 5,068,560 | 11/1991 | Lundquist | 310/125 |
| 5,097,166 | 3/1992 | Mikulic | 310/156 |

FOREIGN PATENT DOCUMENTS 9112183.3  3/1992  Germany ............................ 310/211

*Primary Examiner*—Elvin G. Enad
*Attorney, Agent, or Firm*—Adams & Wilks

[57] ABSTRACT

A high speed electromagnetic rotating machine is arranged to avoid heat generation due to mutual inductance between a stator and rotor and has a stator provided with drive windings for generating a rotating magnetic field to rotate the rotor and position control windings fitted to the stator for generating a magnetic field having a different number of poles than that of the drive windings for controlling the axial or radial position of the rotor when an electric current sufficient to unbalance the magnetic field applied to the rotor by the drive windings is supplied to the position control windings. The rotor has a cage conductors interconnected to form a plurality of closed circuits mounted to the rotor, the closed circuits having a number of poles set so that there is no mutual inductance between the position control windings and the cage conductors. The cage conductors are connected by circumferentially-divided end rings rigidly connected by a retaining ring or by axially divided end rings directly connected to the rotor shaft. In one embodiment, the cage conductors are arranged in four-pole closed circuits, the drive windings have four poles, and the position control windings have two poles. In an alternative embodiment, the cage conductors may be arranged in two-pole closed circuits, the drive windings have two poles and the position control windings have four poles.

18 Claims, 16 Drawing Sheets

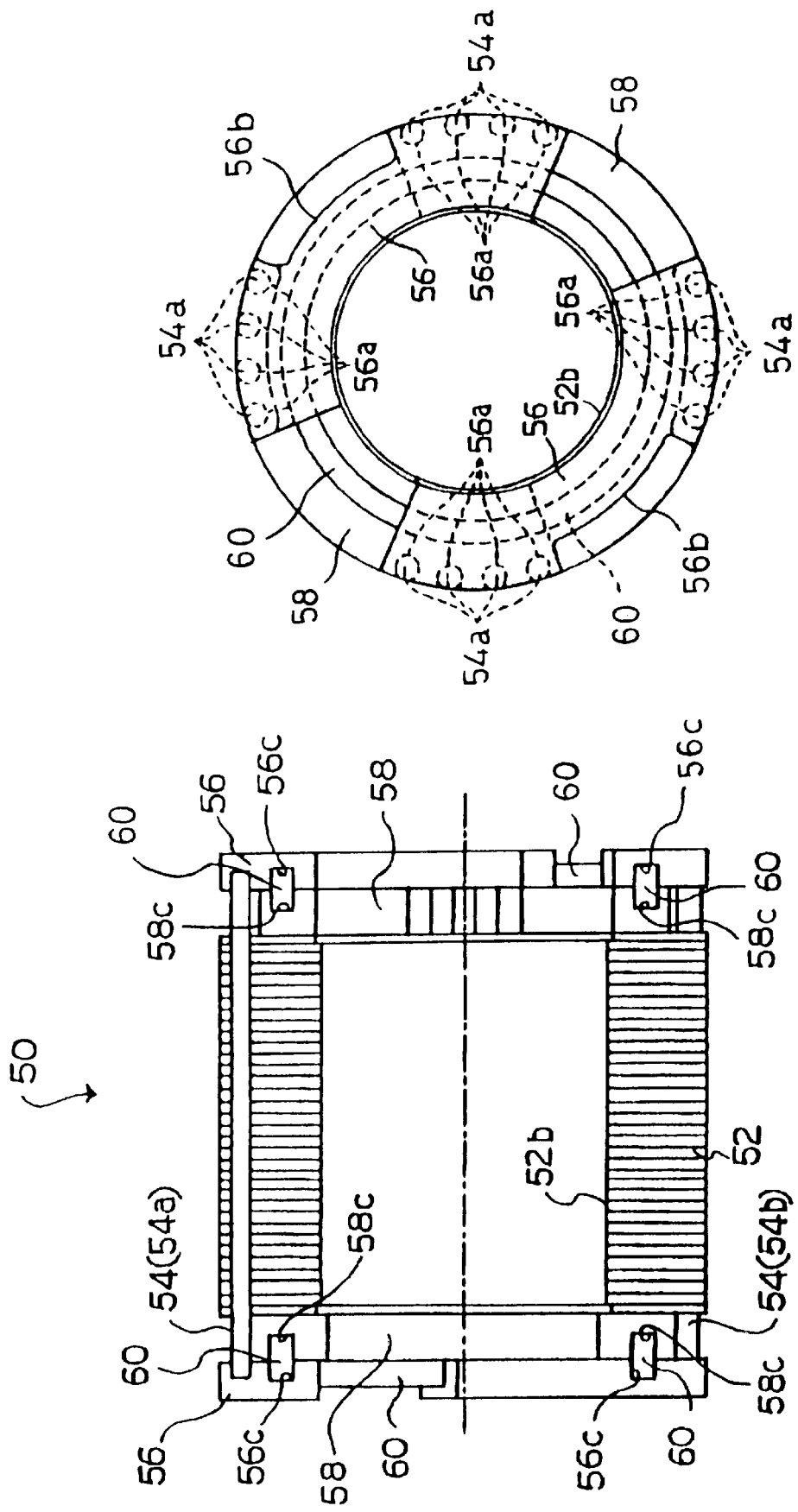

F I G. 1C
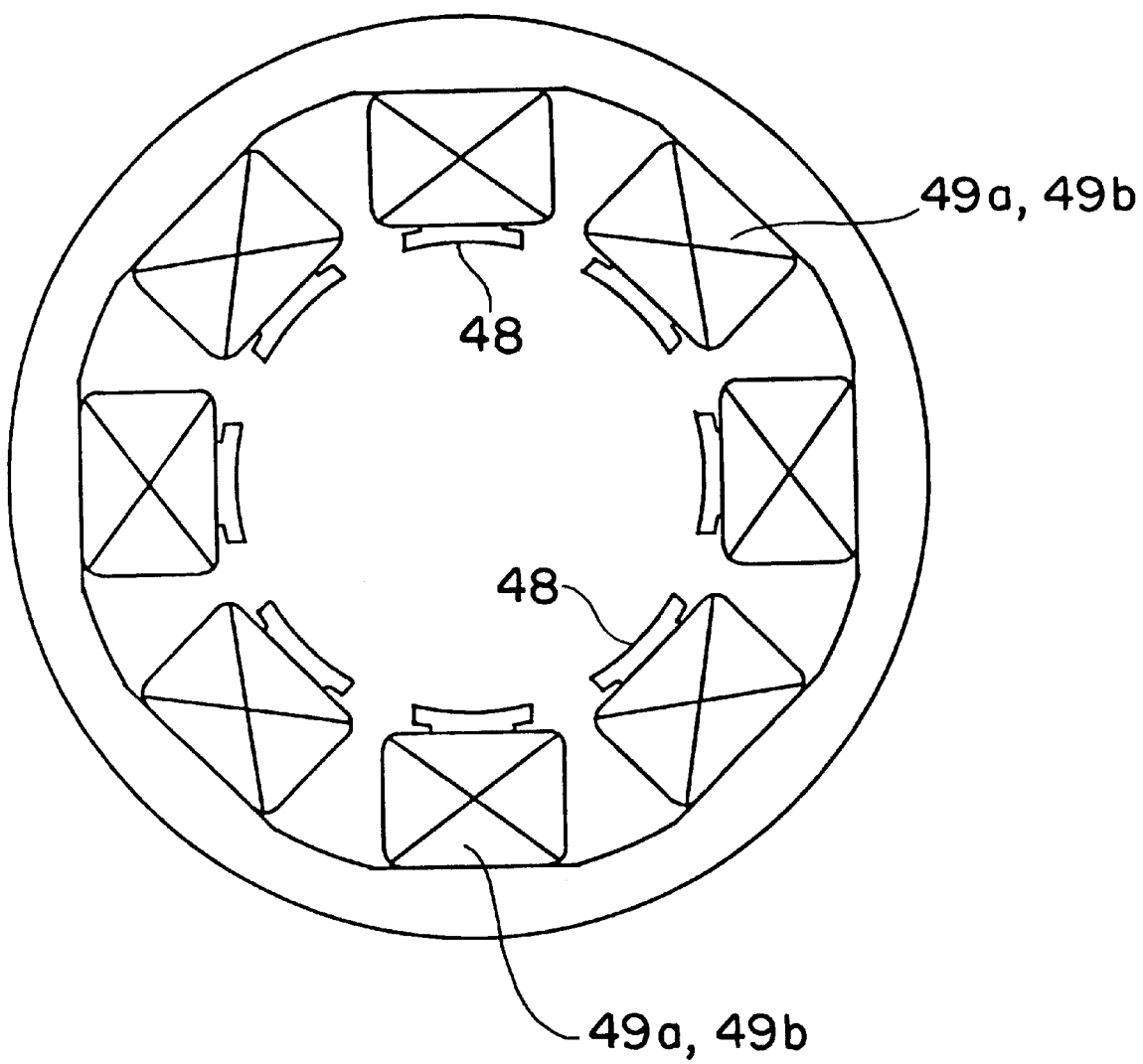

FIG. 8

| S | Q | | | |
|---|---|---|---|---|
|   | 1 | 2 | 3 | 4 |
| N  2 | 8 | 1 6 | 2 4 | 3 2 |
| 3 | 1 2 | 2 4 | 3 6 | 4 8 |
| 4 | 1 6 | 3 2 | 4 8 | 6 4 |
| 5 | 2 0 | 4 0 | 6 0 | 8 0 |
| 6 | 2 4 | 4 8 | 7 2 | 9 6 |
| 7 | 2 8 | 5 6 | 8 4 | 1 1 2 |
| 8 | 3 2 | 6 2 | 9 6 | 1 2 8 |

( S = 4 × N × Q )

F I G. 1 2 A
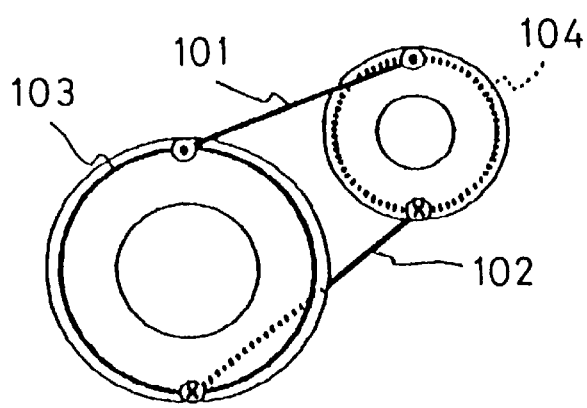
F I G. 1 2 B
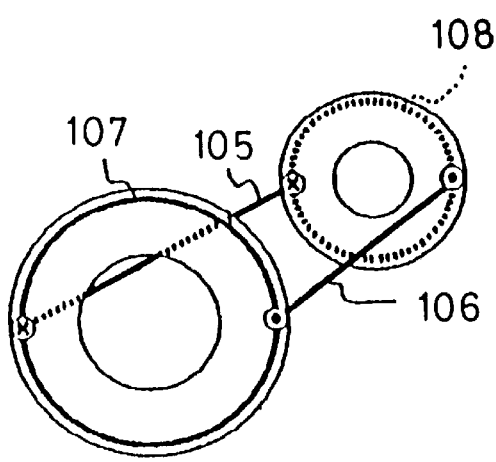
F I G. 1 3 A
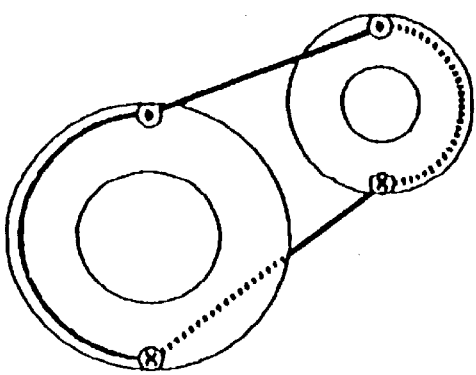
F I G. 1 3 B
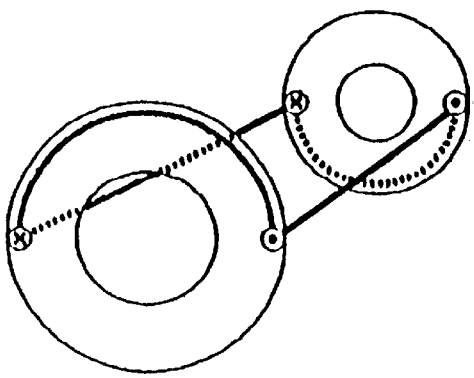

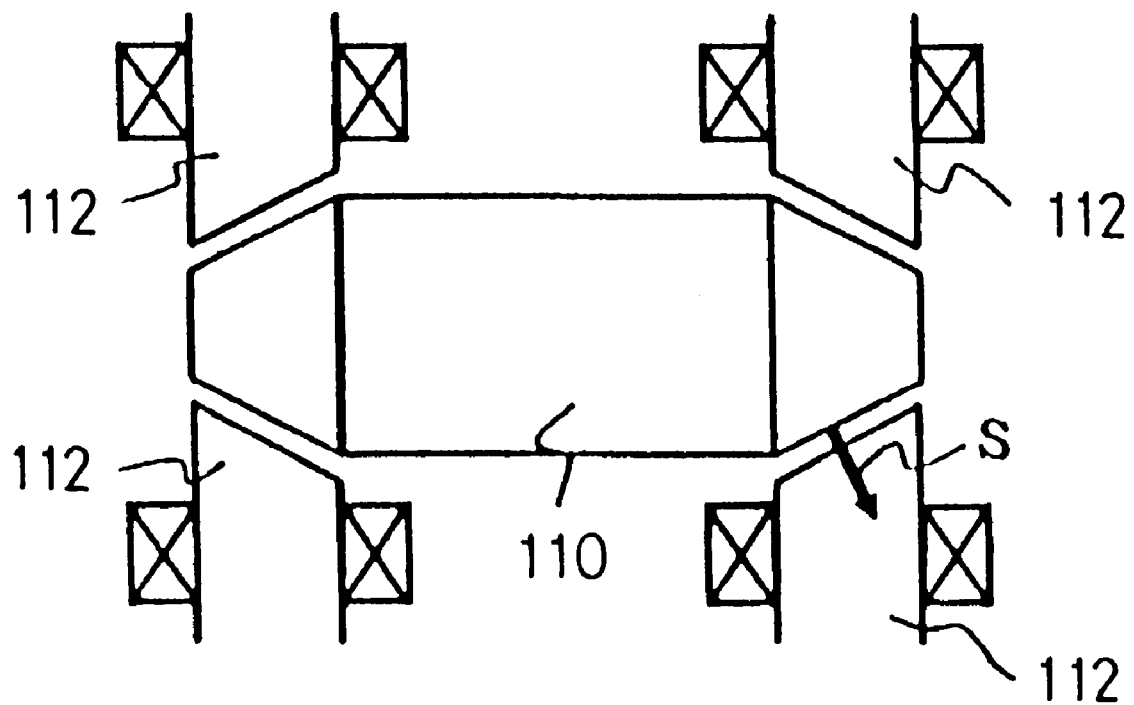
F I G. 1 6

F I G. 1 8
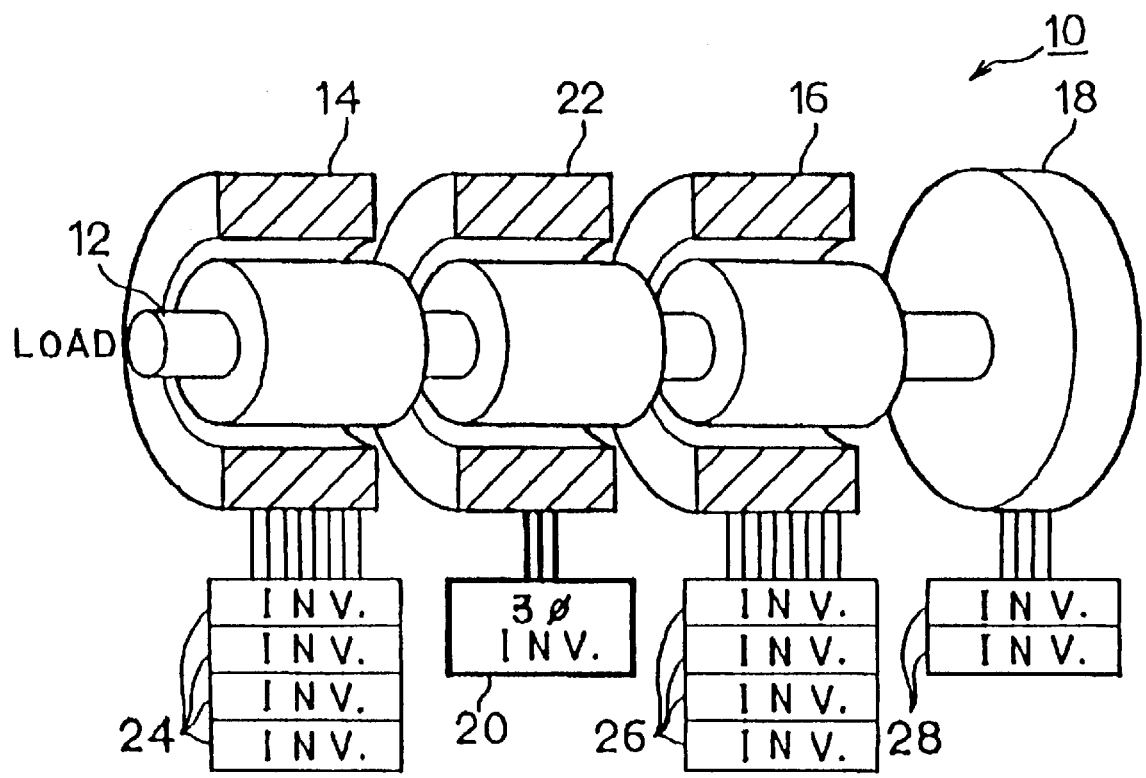

ELECTROMAGNETIC ROTARY MACHINE HAVING MAGNETIC BEARING

BACKGROUND OF THE INVENTION

The present invention relates to electromagnetic rotary machines and more particularly to an electromagnetic machine such as an induction motor or an induction generator wherein a stator is provided with a position control winding to form a magnetic bearing.

There is an increasing need for a high speed, high power motor in a machine tool, a turbo molecular pump, and a flywheel. In order to rotate the motor at high speeds and eliminate the need for maintenance for a long period of time, there is a tendency for the motor to include a magnetic bearing.

FIG. 18 shows a high speed motor with a plurality of magnetic bearings of a five-shaft control type.

A high speed motor 10 includes two radial magnetic bearings 14 and 16 and a thrust bearing 18. A rotor 12 is radially supported by the two radial magnetic bearings 14 and 16 and axially supported by the thrust bearing 18 while the rotor 12 is maintained out of contact. A three-phase inverter 20 is adapted to actuate a motor 22 so as to rotate the rotor. Each of the magnetic bearings 14, 16 and 18 includes an electromagnet so as to produce a radial or axial magnetic force. An exciting current flows through each of the electromagnets under the control of three single-phase inverters 24, 26 and 28. This enables positional control of the rotor 12.

The size of the radial bearings 14 and 16 tends to be larger in order to produce sufficient magnetic force to support the rotor 12. This results in an increase in the axial length of the rotor 12 and thus, creates a problem that a resilient vibration occurs when the rotor is rotated at high speeds. To provide high power, it is necessary to further increase the axial length of the rotor 12. This brings about an increase in the extent of suction of the motor. To this end, it is necessary to increase the size of the magnetic bearings. This lowers the critical speed of the motor and makes it difficult to rotate the motor at higher speeds.

Accordingly, there has recently been proposed an electromagnetic rotary machine wherein a motor stator is provided with magnetic bearing position control windings so as to reduce its axial length and produce high power.

FIG. 19 shows an electromagnetic rotary machine with associated position control windings.

An electromagnetic rotary machine 30 includes a torque winding (not shown) connected to a three-phase inverter 20 and radial position control windings (not shown) wound around motor stators 32 and 34 and adapted to apply a radial magnetic force to a rotor 31. An electric current flows through the radial position control windings under the control of respective three-phase inverters 36 and 38. This control allows for radial positional adjustment of the rotor 31.

With the electromagnetic rotary machine 30, a single rotor is designed to produce both torque and radial force. This permits a reduction in the axial length of the rotor. Also, the electromagnetic rotary machine 30 produces more power than the electromagnetic rotary machine 10 shown in FIG. 18, provided that they have the same axial length.

There have also been proposed several other electromagnetic rotary machines with associated position control windings.

One arrangement is such that a change in exiting magnetic flux produces an axial force. This force is used to adjust the axial position of a disk-shaped motor. This arrangement is applicable to a disk-shaped rotary machine, but not to a popular radial-type rotary machine.

Another arrangement is such that with a typical induction motor, an imbalanced current is caused to flow through a winding so as to produce a radial force. This force is used to adjust radial position of a rotor. However, this arrangement presents a problem that on principle, a radial force can not be produced when the rotor is located at the center.

As disclosed in Japanese laid-open patent publication No. Sho 64-55031, a magnetic bearing and a stepping motor have a common magnetic path. This technique is suitable for a low speed actuator, but not for a high speed rotation since it requires a significantly large number of poles. Also, it is difficult to adopt this technique to machines such as a high power induction machine or permanent magnetic type motor with sine-wave shape super magnetic distribution or magnetic distribution.

Japanese laid-open patent publication No. Hei 4-26188 discloses a machine having a lesser number of poles and having a structure similar to that of a conventional induction machine or permanent magnet type rotary machine.

The machine includes a stator with eight teeth similar to the stator core of a four-phase switched reluctance machine. Four-pole concentrated windings are wound around the stator and divided by respective magnetic poles. The magnetic poles have independently controllable magnetic fluxes.

It is also possible to form a rotating magnetic field and to produce a radial force with fluctuation of magnetic flux of each of the magnetic poles. Japanese laid-open patent publication No. Hei 4-107318 discloses a similar core having distribution windings and providing super magnetic distribution similar to sine-wave distribution. In these technique, however, one unit, which produces two cross radial forces and a torque, requires a minimum of eight single-phase inverters and sixteen wires if two-phase winding are used. This is because four divided windings are independently driven. It also requires a high speed, high accurate, high capacity current drive unit since the radial force and torque are controlled by the same winding current.

To this end, the applicant of the present application has previously proposed an electromagnetic rotary machine wherein two-pole windings are mounted to a four-pole rotary machine so as to produce a radial force, as disclosed in Japanese laid-open patent publication No. Hei 2-193547. This electromagnetic rotary machine is a rotating magnetic field type motor which includes position control windings mounted to a stator. The position control windings are different in pole number and produce a torque as well as a radial force by positively making an imbalanced rotating magnetic field.

FIG. 20 shows the principle of a radial force produced by this type of electromagnetic rotary machine.

A stator 42 includes four-pole windings 44 adapted to produce a torque. A positive current flows through the four-pole windings 44 to form four-pole symmetrical magnetic fluxes H4 when a rotor 40 is located centrally within the stator 42. Four-pole windings, not shown, extend at right angles to the four-pole windings 44. A two-phase alternating current is caused to flow through the four-pole windings so as to form four-pole rotating magnetic fields. As indicated earlier, they may be replaced by three-phase windings. A torque is applied to the rotor 40 if cage windings are mounted to the rotor 40 to form a cage induction machine.

The stator 42 additionally includes two-pole position control windings 46a and 46b adapted to exert a radial magnetic force on the rotor 40. As shown in FIG. 20, two-pole magnetic fluxes H2 are developed when a positive current flows through the position control windings 46a.

In this case, the direction of the magnetic flux H4 by the four-pole windings 44 is opposite to the direction of the magnetic flux H2 by the two-pole windings 46a at the lower gap of the rotor 40 as shown in FIG. 20. As such, the density of the magnetic flux decreases at this gap. On the other hand, the direction of the magnetic flux H4 of the four-pole windings is identical to the direction of the magnetic flux H2 of the two-pole windings at the upper gap of the rotor 40. As such, the density of the magnetic flux increases at the upper gap.

Such an imbalanced magnetic flux distribution causes an upward radial force F, see FIG. 20, to be exerted on the rotor 40. The extent of the radial force F varies with the magnitude of a current flowing through the two-pole windings 46a. A downward radial force can be produced when a current flows through the two-pole windings 46a in an opposite direction.

To produce a lateral force in FIG. 20, a current is caused to flow through the two-pole windings 46b which extend at right angles to the windings 46a. It is thus possible to change the extent and direction of a force by selecting the magnitude and direction of a current flowing through the two-pole cross windings 46a and 46b.

Referring to FIG. 20, the four-pole windings 44 are used to drive the motor, and the two-pole windings 46a and 46b are used to control radial position of the rotor.

Alternatively, the four-pole windings 44 may be used to produce a radial force, and the two-pole windings 46a and 46b may be used to drive the motor.

To produce a radial force and a torque, this electromagnetic rotary machine only requires six three-phase windings and two three-phase inverters. Also, the windings which produce a radial force are separated from the windings which produce a torque. This allows for the use of a small radial force control inverter or amplifier. As the electromagnetic rotary machine employs four-pole and two-pole windings, mutual coupling is zero when the rotor is located centrally within the stator. This prevents application of an induction voltage to the radial force control windings. This principle is widely applicable to a high power rotary machine such as an induction machine, a permanent magnet type synchronizer, and a synchronous reluctance motor with sine-wave magnetic force distribution or sine-wave magnetic flux distribution.

A multiplicity of serial conductors and parallel conductors are used in the rotor of a large winding-type induction machine. These conductors have more slots and provide sine-wave distribution. As the rotor is rotated at high speeds, it must have such a strength as to resist a centrifugal force.

To this end, a high speed rotary machine typically includes a cage rotor with a main shaft being supported by a magnetic bearing. The cage rotor is made of metal which is high in mechanical strength and electrical conductivity. This rotor has a small secondary resistance and is durable.

However, a two-pole induction current flows in the cage rotor if two-pole rotating magnetic fields are developed in the stator of the electromagnetic rotary machine. Also if four stator windings develop four-pole rotating magnetic fields, a four-pole induction current flows through rotor conductors. That is, the cage rotor can be two-pole or four-pole windings with respect to the stator. Accordingly, mutual inductance occurs between the four-pole and two-pole stator windings and the cage windings.

As a result, a two-pole winding current substantially flows toward the cage windings if the two-pole windings are used, for example, as position control windings. This results in generation or less of heat or phase delay. The same problem occurs when the four windings are used as position control windings.

The phase delay can be overcome by phase advancement compensation. The amount of phase delay can be obtained theoretically by measuring motor constant. In a magnetic floating system, displacement of an object is generally measured to effect feedback control. In order to stabilize the system, it is necessary to effect differential control. As such, if phase delay or lag occurs, phase lead angle to be maintained by differential control increases.

SUMMARY OF THE INVENTION

Accordingly, it is an object of the present invention to provide an electromagnetic rotary machine which includes a rotor capable of high speed rotation, and which allows for substantially small or zero mutual inductance between position control windings and the rotor.

In order to achieve the above objects, the present invention provides an electromagnetic rotary machine driven by an electromagnetic induction between a stator and a rotor, the stator including a stator core and stator windings wound around the stator core and adapted to produce a torque, and the rotor including a rotor core, which comprises position control windings wound around the stator core and adapted to exert at least either a radial magnetic force or an axial magnetic force on the rotor, with the number of poles of the position control windings being different from the number of poles of the stator windings, and cage conductors mounted to the rotor core and adapted to form closed circuits with divided end rings, the number of poles of the closed circuits being such that mutual inductance between the position control windings and the cage conductors is zero.

The above objects are further achieved by an arrangement in which the cage conductors comprise four-pole stator windings, two-pole position control windings, and four-pole closed circuits.

The above objects are further achieved by an arrangement in which the cage conductors comprise two-pole stator windings, four-pole position control windings, and two-pole closed circuits.

The above objects are further achieved by an arrangement in which the end rings are divided in a circumferential direction so as to form the closed circuits and interconnected by annular retainer rings.

The above objects are further achieved by an arrangement in which the stator includes a rotary shaft, and the end rings are divided in an axial direction and mounted directly onto the rotary shaft.

The above objects are further achieved by an arrangement in which the cage conductors have magnetic poles formed by a plurality of parallel conductors.

The above objects are further achieved by an arrangement in which the rotor core is skewed.

The above objects are further achieved by an arrangement in which the rotor and the stator core have axially inclined peripheral surfaces whereby the position control windings exert an axial magnetic force on the rotor.

The above objects are further achieved by an arrangement in which the rotor core have ends axially offset from ends of the stator core whereby the position control windings exert an axial magnetic force on the rotor.

With the electromagnetic rotary machine of the present invention, electromagnetic induction between the stator and the rotor causes rotation of the rotor. The position control windings exert at least either a radial or axial magnetic force on the rotor so as to control position of the rotor. The cage conductors of the rotor form closed circuits. The number of poles of the closed circuits are such that mutual inductance between the conductors and the position control windings is zero. No electromagnetic inductance therebetween occurs.

The retainer rings have a rigidity such that the end rings withstand a centrifugal force. Thus, the end rings are firmly united without being subject to separation during high speed rotation.

The end rings are axially divided to form closed circuits and are mounted to the rotary shaft. A torque which is applied to the conductors is transmitted to the rotary shaft through the end rings.

The cage conductors have magnetic poles formed by a plurality of parallel conductors. The plurality of parallel conductors are each short-circuited by the end rings. A current of identical phase flows through the conductors to form each magnetic pole.

The rotor core is skewed to retard the occurrence of space high harmonics.

The rotor and the stator face with each other and have axially inclined peripheral surfaces. This arrangement allows the position control windings to exert an axial magnetic force on the rotor.

The rotor core has end axially offset from ends of the stator core. This arrangement allows the position control winding to exert an axial magnetic force on the rotor.

BRIEF DESCRIPTION OF THE DRAWINGS

FIG. 1A is a side sectional view of a rotor of an electromagnetic rotary machine according to a first embodiment of the present invention;

FIG. 1B is a front view of the rotor of the electromagnetic rotary machine according to the first embodiment of the present invention;

FIG. 1C is a schematic view of the stator core, drive windings and position control windings according to the first embodiment of the present invention;

FIG. 8 is a table showing the relationship among the number of slots, closed circuits and poles of the four-pole windings;

FIGS. 12A and 12B are schematic views of two-pole rotor windings;

FIGS. 13A and 13B are schematic views of two-pole rotor windings;

FIG. 16 illustrates a modified rotor and stator;

FIG. 18 is a schematic view showing the structure of a magnetic bearing;

DETAILED DESCRIPTION OF THE PREFERRED EMBODIMENTS

An electromagnetic rotary machine according to various embodiments of the present invention will now be described in detail with reference to FIG. 1 to 17.

FIG. 1 shows a rotor for use in an electromagnetic rotary machine according to a first embodiment of the present invention. FIG. 1A is a side sectional view of the rotor. FIG. 1B is a front view of the rotor.

Figure 20:
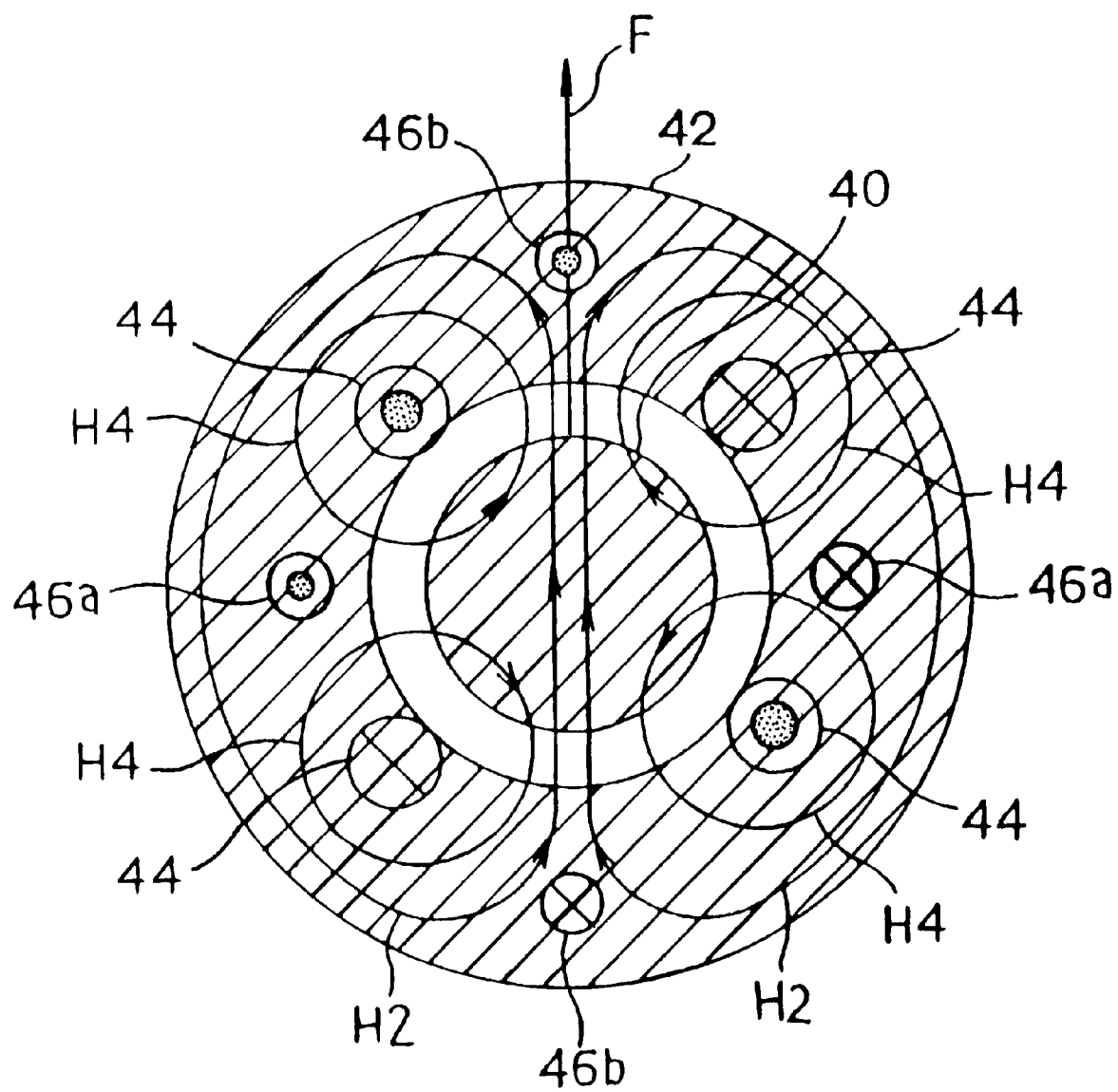
FIG. 20 is a view showing the principle of position control effected by position control windings.

FIG. 1C is a schematic view illustrating the stator core 48, four-pole stator windings or drive windings 49a and two-pole position control windings 49b, which are the same as those in Japanese laid-open patent publication No. Hei 2-193547 discussed in connection with FIG. 20. As illustrated, although the drive windings 49a and position control windings 49b are overlapping, they are independently wound on the stator core 48. The rotor 50 is disposed in the stator core 48.

In this embodiment, the electromagnetic rotary machine is an induction motor. The induction motor includes a stator which exerts a torque on a rotor by the reaction with an induction current induced in a rotating magnetic field. Although not shown, a stator core is located around a rotor 50. Four-pole windings are wound around the stator core to form a rotating magnetic field. Two-pole position control windings are also wound around the stator core to control radial position of the rotor 50.

Figure 2:
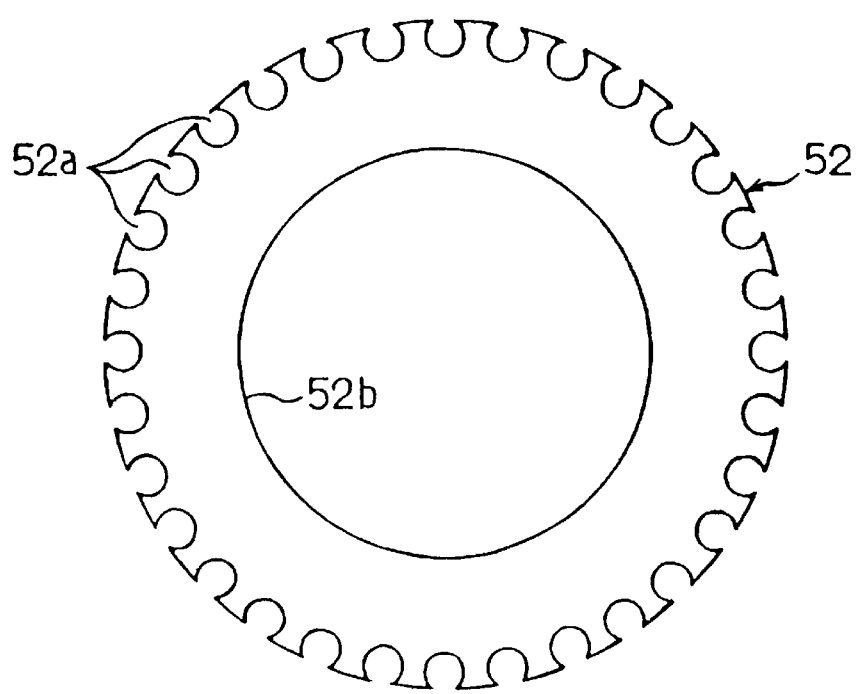
FIG. 2 illustrates the shape of a rotor core of the electromagnetic rotary machine according to the first embodiment of the present invention.

The rotor 50 has an outer contour similar to that of a cage rotor. The rotor 50 includes an iron core 52 made of silicon steel or similar material, conductors 54 through which an induction current induced by a rotating magnetic field flows, and end rings 56 and 58 attached to opposite sides of the conductors 54 and adapted to short-circuit particular conductors. As shown in FIG. 2, the rotor core 52 has a plurality (32) of slots 52a arranged along its outer periphery and adapted to receive the conductors 54. The rotor core 52 has an inner opening 52b through which a cylindrical rotary shaft, not shown, passes.

In this embodiment, the end rings 56 and 58 are made of an electrically conductive material such as copper and have a shape such that a short-circuit ring for a cage conductor is divided in a circumferential direction. As shown in FIG. 1, these end rings, which are mounted to the rotor core 52, are designed to short-circuit particular conductors 54 and constitute four-pole windings as will later be described in detail.

Figure 3A:
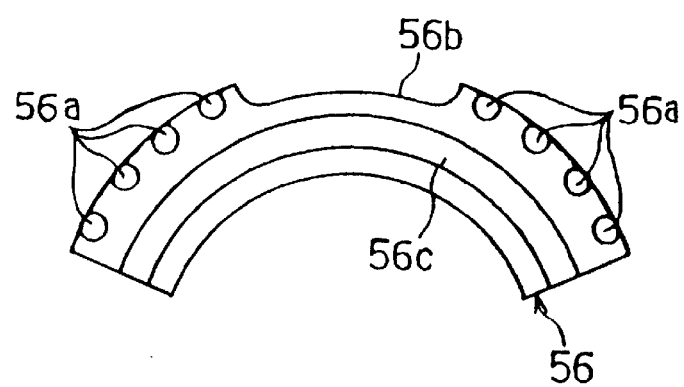
FIG. 3A is a front view showing the shape of an end ring mounted to the rotor of the electromagnetic rotary machine according to the first embodiment of the present invention.
Figure 3B:
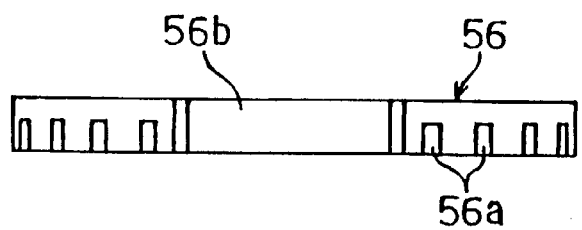
FIG. 3B is a plan view showing the shape of the end ring of the rotor of the electromagnetic rotary machine according to the first embodiment of the present invention.

FIG. 3 illustrates the shape of the outer end ring 56 shown in FIG. 1A. FIG. 3A is a front view of the end ring. FIG. 3B is a top plan view of the end ring.

As shown in FIG. 3A, the end ring 56 extends around approximately three-eighths of the entire circumference of a circle and includes four slots 56a arranged at either end of the end ring and adapted to receive one end of the respective conductors 54, and a central recess 56b located at the center of the outer periphery of the end ring and having a depth greater than the diameter of the conductor 54, and an arcuate side groove 56c.

Figure 4:
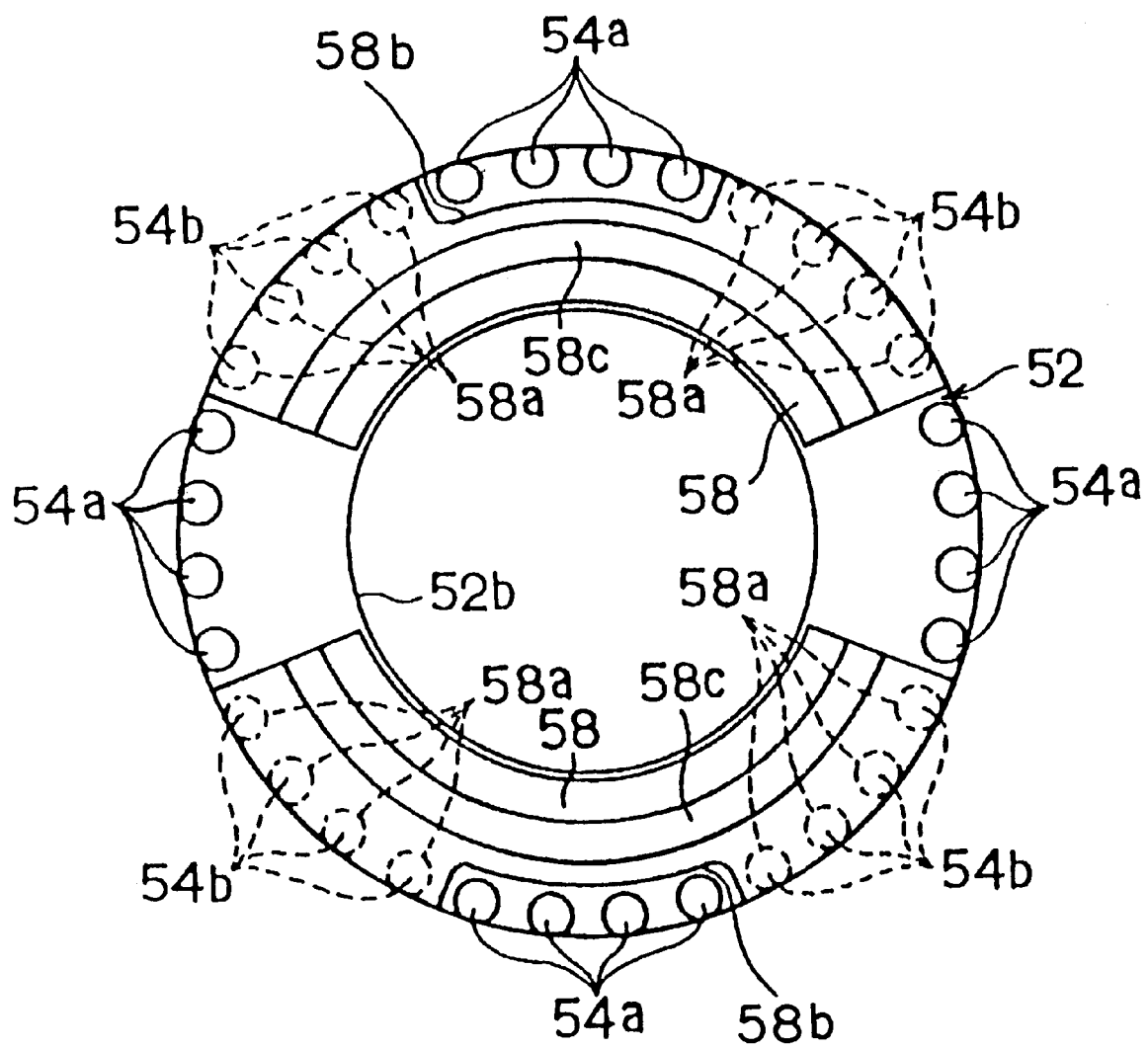
FIG. 4 is a front view of the electromagnetic rotary machine rotor with only an inner end ring mounted thereto.

FIG. 4 illustrates the shape of the inner end ring 58 shown in FIG. 1 and shows the manner in which the end ring 58 is mounted to the rotor core 52.

Like the end ring 56, this end ring 58 includes a plurality of slots 58a and a recess 58b as shown in FIG. 4. An arcuate groove 58c is formed in one side of the end ring 58 opposite to the side of the end ring 56 in which the arcuate groove 56c is formed.

In this embodiment, the conductors 54 are composed of long and short conductors 54a and 54b. As shown in FIG. 4, a plurality of sets of four long and short conductors are arranged in an alternate fashion.

The end rings 56 and 58 are mounted to the rotor core 52 in the following manner.

First, the end rings 58 are mounted to opposite ends of the rotor core 52 with one end of the short conductors 54b being inserted within the corresponding slots 58a. The conductors 54b are then laser welded or otherwise secured within the slots 58a. As shown in FIG. 4, the end rings 58 are adapted to short-circuit the end rings 54b so as to form four-pole windings. At this time, those long conductors 54a within the recess 58b and between the end rings 58 are maintained out of contact with the end rings 58. In other words, the long conductors 54a are insulated from the end rings 58 and extend from one side toward the reader in FIG. 4.

Next, annular retainer rings 60 are fit within the grooves 58c of the end rings. The end rings 56 are then fit around the end rings 58 with the retainer rings 60 being fit within the grooves 56c. At this time, the end rings 56 are circumferentially offset from the end rings 58 by 45° as shown in FIG. 1B. This allows one end of the long conductors 54a to be inserted within the slots 56a. The conductors 54a are similarly welded or fixed within the slots 56a.

In this way, particular conductors 54a are short-circuited by the end rings 56 to thereby form four-pole windings with two short-circuited paths. In this embodiment, the conductors 54b short-circuited by the end rings 58 and the conductors 54a short-circuited by the end rings 56 collectively form four-pole windings.

As shown in FIG. 1A, the retainer rings 60 are fit within the grooves 56c of the end rings 56 and the grooves 58c of the end rings 58 to hold the end rings 56 and 58 together. The end rings 56 and 58 are thus free from separation which may otherwise occur due to a centrifugal force during rotation. A Teflon coating or insulating material may be applied between the end rings 56 and 58 so as to insulate the end rings from one another.

Reference will next be made to the basic structure of the windings wound around the rotor 50.

FIG. 5 schematically shows one parallel conductor and two closed circuits composed of four rotor windings. FIGS. 5A and 5B show closed circuits, respectively. The rotor core is made from a multi-layer steel plate or iron mass. In FIG. 5, the reference numerals 66 and 68 designate opposite ends of the rotor core. Also, "dot marks" indicate the direction in which a current flows from the sheet of FIG. 5 toward the reader. "Cross marks" indicate the direction in which a current flows in a direction away from the reader.

Figure 5A:
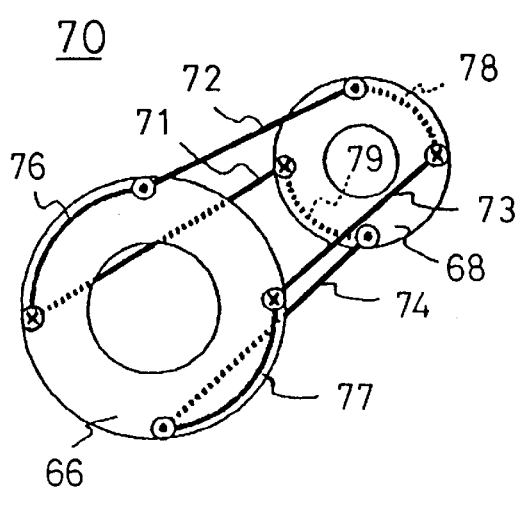
FIGS. 5A and 5B are schematic views of closed circuits composed of four-pole windings.

As shown in FIG. 5A, four conductors 71 to 74 are carried by the rotor core. In a steel plate 66, the conductors 71 and 72 are short-circuited by an end ring 76 which is circumferentially divided as shown in FIG. 3. Similarly, the conductors 73 and 74 are short-circuited by an end ring 77. In a steel plate 68, the conductors 72 and 73 are short-circuited by an end ring 78, whereas the conductors 74 and 71 are short-circuited by an end ring 79. These conductors 71 to 74 and the end rings 76 to 79 collectively form a closed circuit with four-pole windings.

Figure 5B:
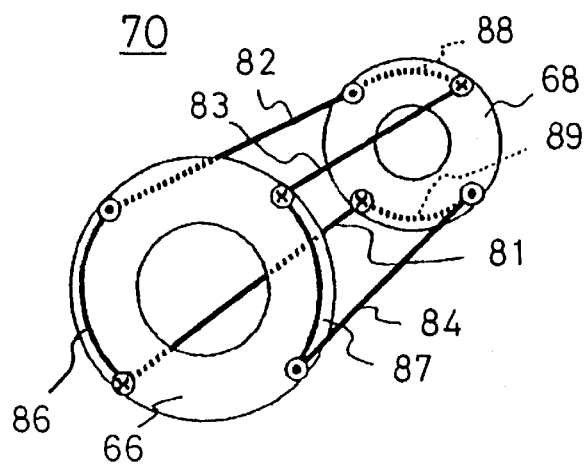

As shown in FIG. 5B, four conductors 81 to 84 are mechanically offset from the conductors 71 to 74 by 45°. The conductors 81 to 84 and end rings 86 to 89 in the steel plates 66 and 68 collectively form another closed circuit with four-pole windings. The four conductors 81 to 84 may be mechanically offset from the four conductors 71 to 74 by an angle other than 45°, but must be arranged in a symmetrical fashion. Asymmetrical arrangement causes unbalance of the rotor, such as slot ripple, during rotation.

These two closed circuits are formed in the rotor core in an insulated relation. When the four-pole windings in the stator develop four-pole rotating magnetic fields, a rotor 70 with two closed circuits acts as a four-pole induction motor by an induction current.

The four-pole windings, which are composed of the long conduits 54a and the outer end rings 56 in the rotor 50 shown in FIG. 1, correspond to the closed circuit shown in FIG. 5A. The four-pole windings, which are composed of the short conductors 54b and the inner end rings 58, correspond to the closed circuit shown in FIG. 5B.

The induction machine shown in FIG. 5A and 5B include a rotor with eight slots, but this type of machine is not widely used in the art. To prevent skin effect, it is generally necessary to mount the conductors near the surface of the rotor. Also, to improve efficiency, it is necessary to increase the cross sectional area of the conductors. Also, to effectively develop an exiting magnetic flux, an iron part needs be present in near the surface of the rotor. To meet these needs, a multiplicity of slots are typically formed in the rotor core.

Figure 6:
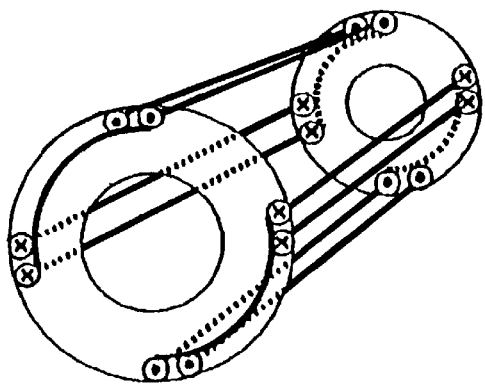
FIG. 6 is a schematic view of four-pole windings each with two parallel conductors.
Figure 7A:
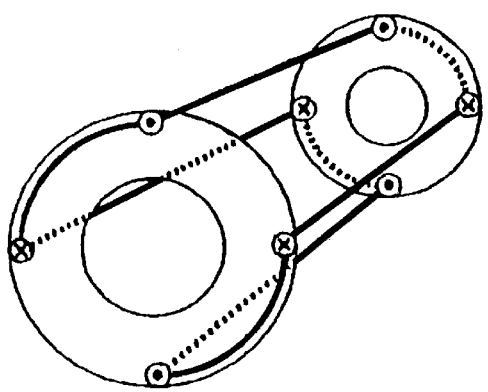
FIGS. 7A, 7B and 7C are three closed circuits each composed of four-pole windings.
Figure 7B:
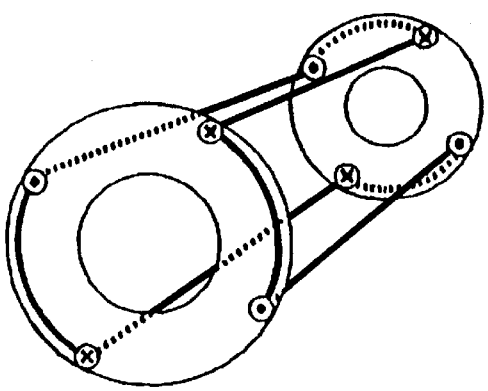
Figure 7C:
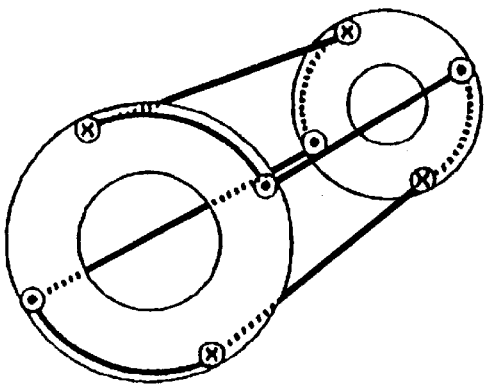

Referring specifically to FIG. 6, a closed circuit has a large number of conduits and includes two pairs of parallel conduits short-circuited by a single end ring. Referring to FIGS. 7A to 7C, a rotor also has a larger number of conductors and is composed of three closed circuits which are arranged in an insulated relation and mechanically offset by 30°. Although not shown, each closed circuit may be composed of a set of three parallel conductors. Alternatively, a rotor may include four closed circuits.

Figure 5C:
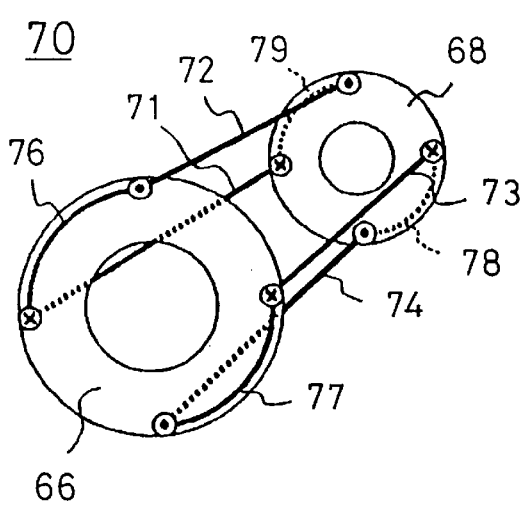
FIGS. 5C and 5D are schematic views of alternative four-pole windings.
Figure 5D:
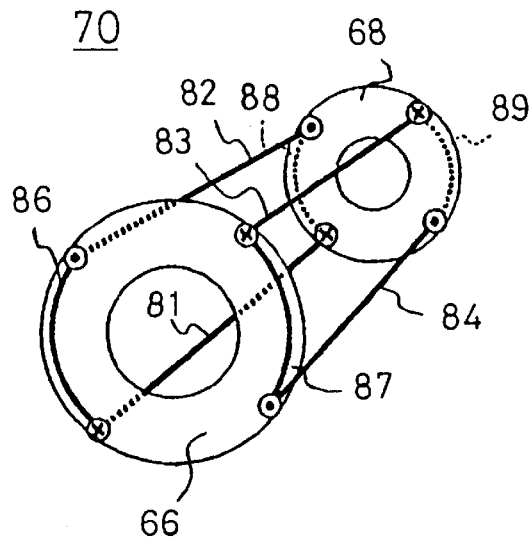

The windings which form a closed circuit, as shown in FIGS. 5A and 5B, may take any other form, for example, one shown in FIGS. 5C and 5D.

The number (S) of slots for four poles is represented by the equation shown in FIG. 8. That is, $S = 4 \times N \times Q$, where N is the number of closed circuits, and Q is the number of parallel conductors.

In the rotor 50 shown in FIG. 1, the four conductors 54a and the four conductors 54b are short-circuited by the end rings 56 and 58, respectively. That is, the rotor 50 has two closed circuits and four parallel conductors. Accordingly, the number of slots is thirty-two (S=4×2×4).

Advantageously, the number of end rings can be reduced by increasing the number of parallel conductors, provided that the number of slots are the same.

Reference will now be made to the operation of this embodiment.

When four-pole rotary magnetic fields are developed in the rotor windings, an induction current flows through the conductors 54a and 54b of the rotor 50. The induction current and the rotary magnetic fields jointly produce a torque whereby the rotor 50 is rotated. At the same time, radial position of the rotor 50 is controlled by the two-pole position control windings of the stator. This radial position control is effected in the same manner as shown in FIG. 20.

However, since the rotor 50 includes the four-pole windings as stated earlier, mutual connection is zero for the following reasons.

In this embodiment, the stator includes the two-pole position control windings, and the rotor 50 includes the four-pole windings short-circuited by the end rings 56 and 58. With this arrangement, where the rotor 50 is located centrally within the stator, the flux interlinkage of the four-pole rotor windings is zero even if two-pole symmetrical magnetic fields are developed upon passing of a current through the position control windings. Accordingly, mutual induction between the four-pole rotor windings and the two-pole position control windings of the stator is overcome. No flow of an induction current results.

When the rotor 50 is driven, no mutual connection occurs between the four-pole rotor windings composed of the conductors 54a and 54b and the two-pole position control windings as stated earlier. Thus, a phase delay between a position control current and a radial electromotive force is significantly small.

The position control current barely flows into the rotor windings. The rotor 50 is less subject to heat loss. Also, this embodiment employs four parallel conductors with thirty-two slots. This arrangement reduces the extent of slot ripple.

The rotor 50 is similar in structure to a cage rotor, except that the short-circuit rings are divided in a circumferential direction. Each of the conductors 54 and 54b is significantly larger in diameter than those of a winding-type rotor and better withstands a centrifugal force. Moreover, in this embodiment, the end rings 56 and 58 are retained by the retainer rings 60. The rotor 50 thus has a strength equal to that of a typical cage rotor and is capable of high speed rotation.

As in a conventional cage winding, the rotor core 52 and the conductors 54 may be skewed to reduce space high harmonics and thus, torque ripple and vibrations.

Reference will now be made to a second embodiment.

Figure 9:
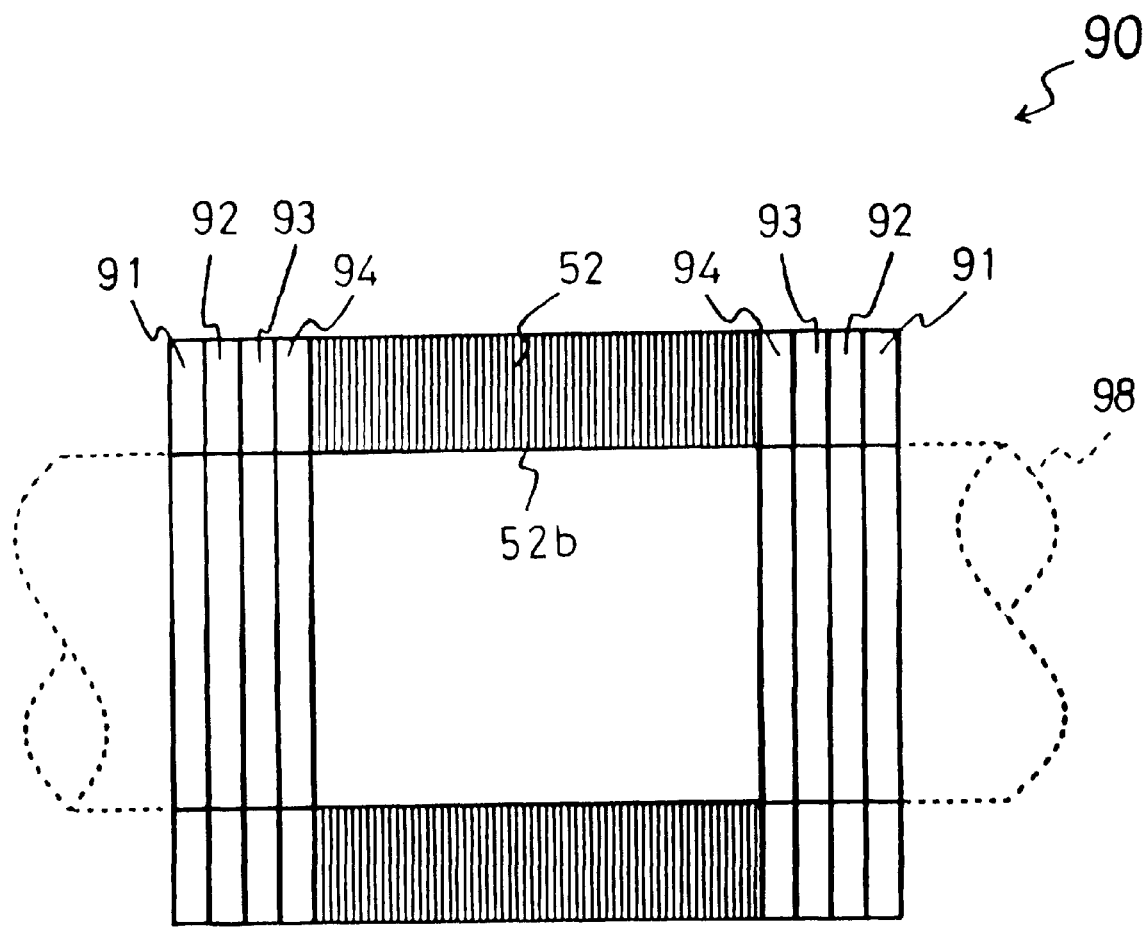
FIG. 9 is a side sectional view of a rotor of an electromagnetic rotary machine according to a second embodiment of the present invention.

FIG. 9 shows a rotor 90 of an electromagnetic rotary machine made according to a second embodiment. The rotor 90 includes closed circuits shown in FIGS. 5C and 5D. Like parts are given like reference numerals and will not be described herein.

In this embodiment, too, a stator, not shown, includes four-pole windings and two-pole position control windings. The four-pole windings develop a rotating magnetic field so as to rotate the rotor 90. Radial position of the rotor is controlled by the two-pole position control windings.

A set of four end rings 91 to 94 are mounted to either end of the rotor core 52. The end rings each have a thickness less than that of the end rings 56 and 58 of the first embodiment and are identical in shape as opposed to the first embodiment.

Figure 10:
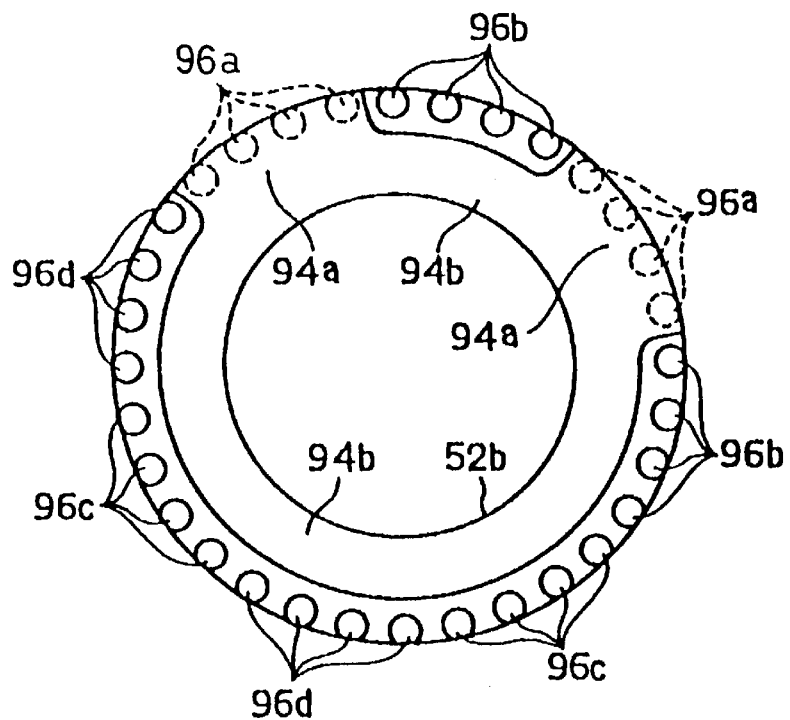
FIG. 10 is a front view showing the shape of an end ring for use in the rotor of the electromagnetic rotary machine according to the second embodiment of the present invention.

FIG. 10 shows the shape of the end ring 94. The end ring 94 is not divided in a circumferential direction. The end ring 94 is substantially annular in shape and includes two large diameter portions 94a and a continuous small diameter portion 94b. Four slots are formed in each of the two large diameter portions 94a so as to hold conductor ends, as in the slots 56a of the first embodiment.

As shown in FIG. 10, four conductors 96a to 96d have different lengths and are held in the slots 52a of the rotor core 52. One ends of these conductors are inserted within the slots of the end rings 91 to 94, respectively.

For example, the conductors 96a, 96b, 96c and 96d are welded or otherwise secured to the end rings 94, 93, 92 and 91, respectively. By this arrangement, the conductors 96a, 96b, 96c and 96d are short-circuited by the end rings 94, 93, 92 and 91, respectively.

With the end ring 94 mounted to the rotor core 52 as shown in FIG. 10, the conductors 96b, 96c and 96d within the small diameter portion 94b are maintained out of contact with the end ring 94 or arranged in an insulated relation. As such, the end ring 94 is electrically connected only to the conductors 96a inserted into the slots of the large diameter portion 94a. This is also the case with other end rings 91 to 93. The rotor is composed of closed circuits shown in FIGS. 5C and 5D.

In the closed circuits shown in FIGS. 5A and 5B, the end rings may be mechanically offset by 90° to provide a similar rotor. That is, the end ring 94 of this embodiment is constructed such that the end rings 56 and 58 which serve to short-circuit the conductors are divided in an axial direction.

As thus far explained, the end rings 91 to 94 are electrically connected to the conductors 96a to 96d. The conductors 96a to 96d of this embodiment collectively form four-pole windings as in the first embodiment. Mutual connection between the four-pole windings and the two-pole position control windings is significantly small or zero.

Also, in this embodiment, the inner opening 52b of the rotor core 52 has a diameter equal to that of the end rings 91 to 94. As shown by broken line in FIG. 9, a rotary shaft 98 extends through the rotor core 52. The end rings 91 to 94 are shrink fit or otherwise directly secured to the rotary shaft 98. A coating layer is applied between the rotary shaft 98 and the end rings 91 to 94 so as to insulate them from one another.

With this arrangement, a torque is developed by a rotating magnetic field as the rotor is driven and effectively transmitted to the rotary shaft 98. The rotating magnetic field and induction current in the stator cooperate to exert a circumferential magnetic stress (torque) on the conductors 96a to 96d. This stress is transmitted to the rotary shaft through the end rings 91 to 94 which are directly connected or fixed to the conductors 96a o 96d. In the first embodiment, the end rings 56 and 58 are not directly connected to the rotary shaft. Thus, this embodiment is able to more effectively transmit a driving torque to the rotary shaft 98 than the first embodiment.

In this embodiment, the end rings 91 to 94 have an annular shape. In the first embodiment, the end rings 56 and 58 are divided in a circumferential direction. Thus, the end rings 91 to 94 has a mechanical strength greater than that of the end rings 56 and 58. The end rings 91 to 94 better withstand a centrifugal force and are capable of high speed rotation.

Other structure and advantages are similar to those of the first embodiment.

Figure 11:
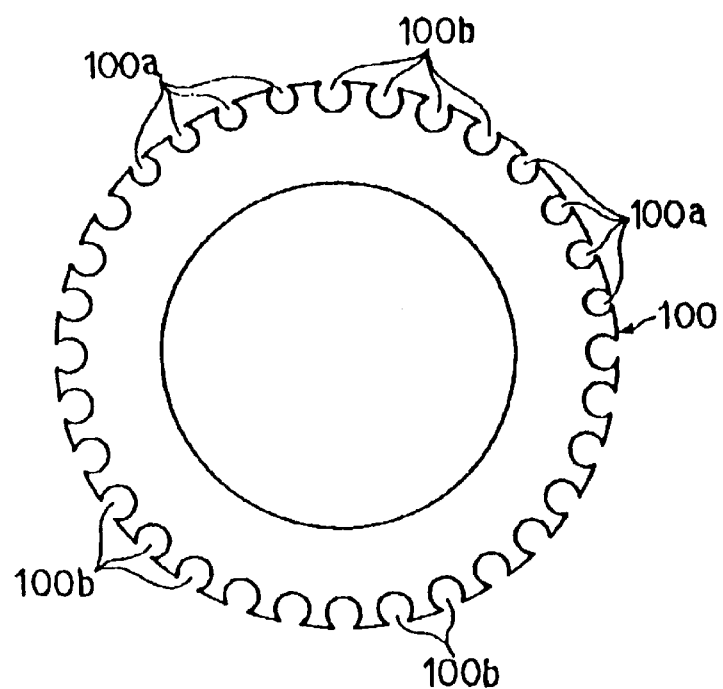
FIG. 11 is a front view showing the shape of a modified end ring of the rotor of the electromagnetic rotary machine according to the second embodiment of the present invention.

The end rings 91 to 94 may take any other form, for example, like one shown in FIG. 11.

Referring to FIG. 11, an end ring 100 includes slots 100a. These slots 100a have a diameter equal to that of conductors which are short-circuited by the end ring. Other slots 100b have a larger diameter and are maintained out of contact with the conductors. Those conductors inserted within the slots 100b are insulated, whereas those conductors inserted within the slots 100a are short-circuited.

In the foregoing embodiments, the stator includes four-pole windings and two-pole position control windings, and the rotor includes four-pole windings such that zero mutual connection occurs between the four-pole windings and the two-pole position control windings. Alternatively, the stator may include two-pole windings for producing a torque, and four-pole position control windings. In such a case, the rotor may include two-pole windings.

Reference will now be made to such a winding arrangement.

FIG. 12 schematically shows a rotor with a single parallel winding, two closed circuits and two-pole windings.

FIGS. 12A and 12B show two different closed circuits.

As. shown in FIG. 12A, a rotor core carries two conductors 101 and 102. Opposite ends of the conductors 101 and 102 are short-circuited by end rings 103 and 104 to provide a closed circuit.

Referring to FIG. 12B, two conductors 105 and 106 are mechanically offset from the conductors 101 and 102 by 90° and cooperate with end rings 107 and 108 to provide another closed circuit. The conductors 101 and 102 may be offset by an angle other than 90°, but must be arranged in a symmetrical fashion. Unbalance or slot ripple may otherwise result during rotation of the rotor.

Like the second embodiment, the two closed circuits form a rotor with the end rings being divided in an axial direction for insulation purposes. The two-pole windings are wound around the rotor to develop two-pole rotating magnetic fields. By the resulting induction current, the rotor functions as a two-pole induction motor.

The conductors and the end rings may be connected in a manner shown in FIGS. 13A and 13B with the end rings being circumferentially divided and extending half the entire circumference of the end rings.

Figure 14:
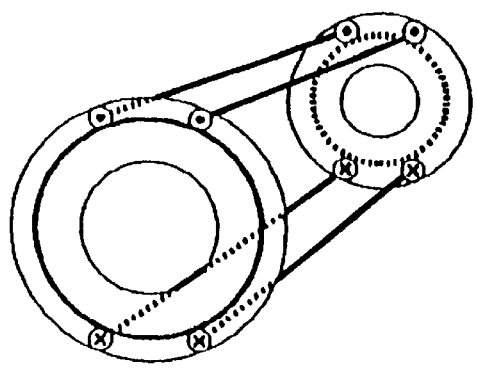
FIG. 14 is a schematic view of two-pole rotor windings with two parallel conductors.
Figure 15A:
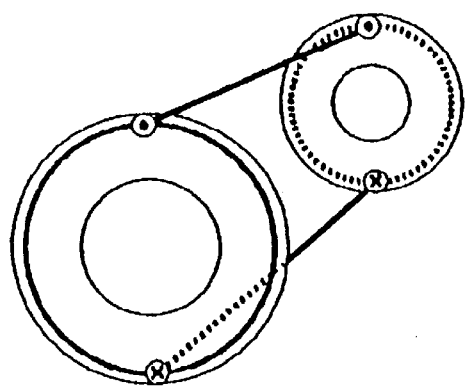
FIG. 15 is a schematic view showing three closed circuits each composed of two-pole rotor windings.
Figure 15B:
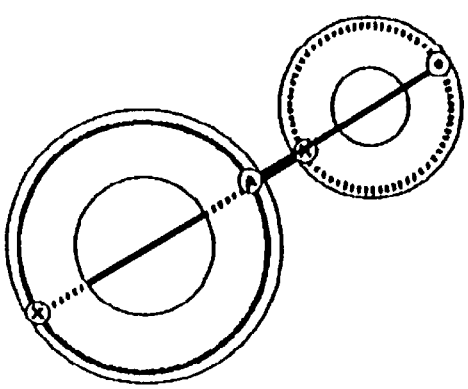
Figure 15C:
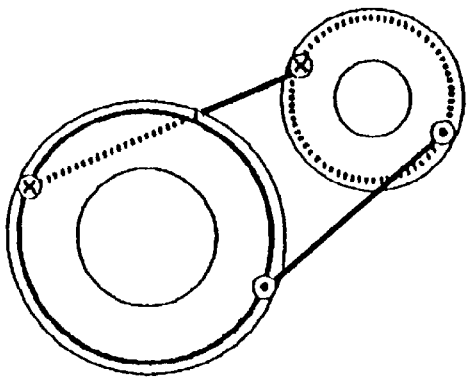

In order to reduce slot ripple, there may be provided a larger number of slots, as in the two-pole position control windings. For example, there may be provided two parallel conductors short-circuited by one end ring as shown in FIG. 14. This results in an increase in the number of conductors per one closed circuit. Also, as shown in FIGS. 15A, 15B and 15C, three closed circuits are arranged in an insulated relation and mechanically offset from one another by 60° with equal intervals. These three closed circuits form a rotor and provide more slots. Although not shown, there may be provided three parallel conductors or four closed circuits in order to form a rotor.

Where a rotor includes two-pole windings, two-pole magnetic fields are developed as the rotor is driven. On the other hand, a stator includes four-pole position control windings. As far as the rotor is located substantially centrally within the stator, an induction current by the position control windings barely flows through the rotor windings. In other words, where the four-pole stator windings are used as position control windings, and two-pole windings are used as rotor windings, mutual inductance between the position control windings and the rotor windings is zero or significantly small if any.

Figure 17:
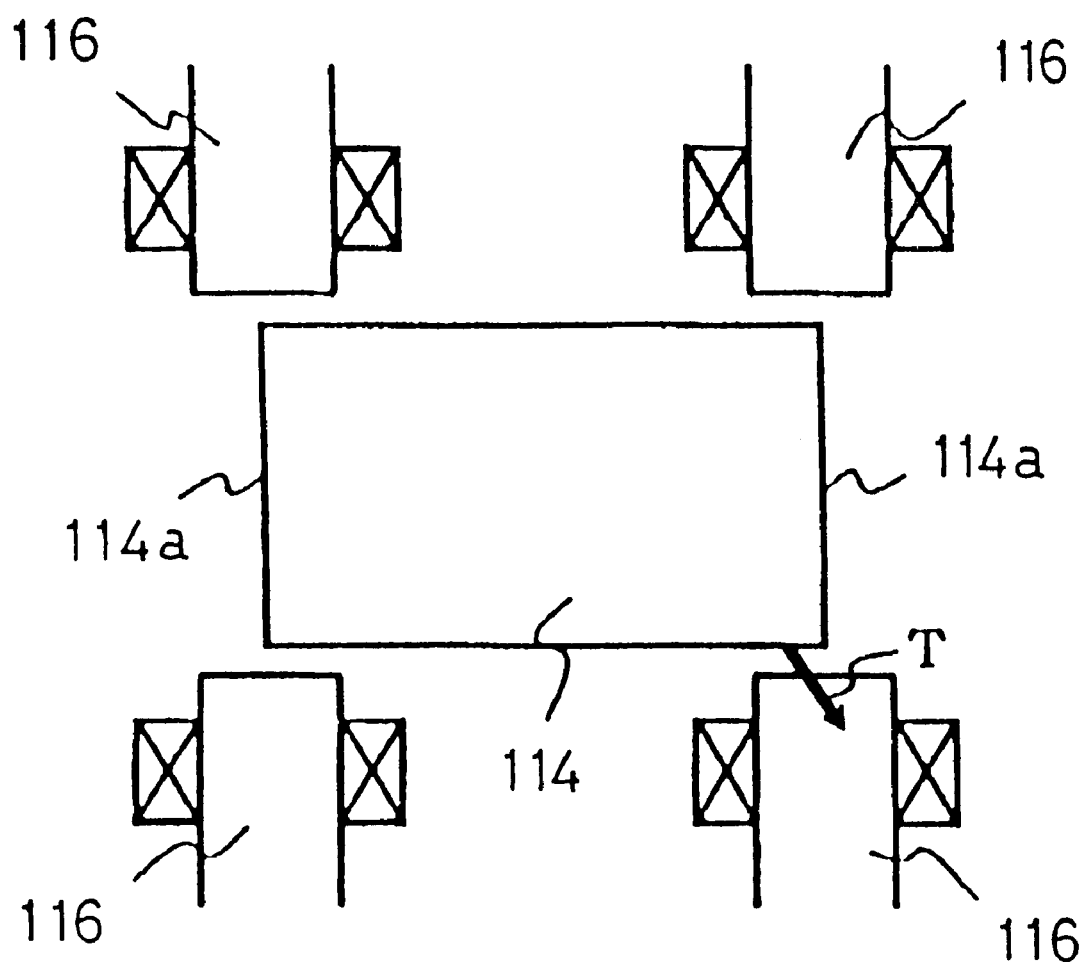
FIG. 17 illustrates another modified rotor and stator.
Figure 19:
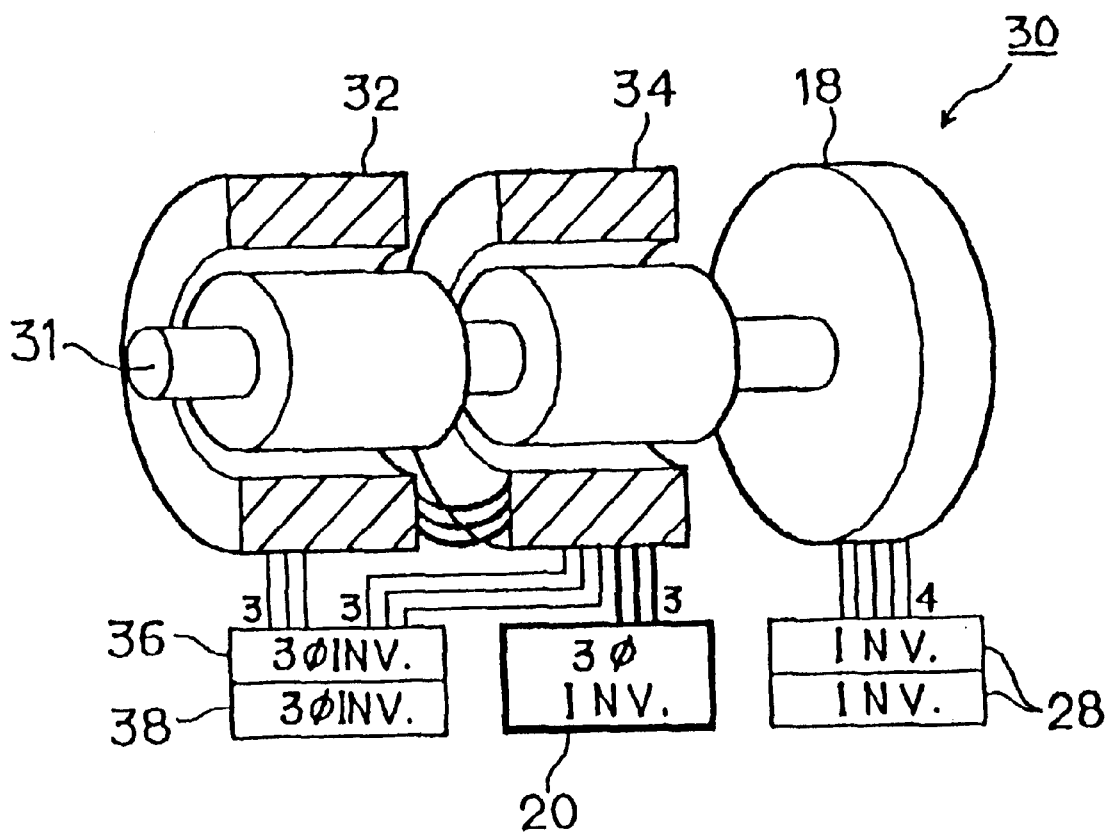
FIG. 19 is a schematic view of an electromagnetic rotary machine with position control windings.

In any of the foregoing embodiments, the position control windings of the stator serve to control radial position of the rotor. As shown in FIGS. 16 and 17, the stator and the rotor may be conical or staggered. This allows for axial position control of the rotor.

Referring specifically to FIG. 16, a rotor 110 has substantially conical opposite ends. A stator core 112 has an inner peripheral surface shaped to face with the surface of the conical ends of the rotor 110. A magnetic force is developed in the direction of the arrow S by the stator core 112. Through the magnetic force, position of the rotor 110 can be controlled in not only radial, but also axial directions.

Referring to FIG. 17, a rotor 114 has opposite ends 114a offset from the center of stator cores 116. With this configuration, a magnetic force is developed in the direction of the arrow T.

In the foregoing embodiments, the electromagnetic rotary machine is an induction motor, but may be an induction generator.

With the electromagnetic rotary machine of the present invention, the number of poles of the closed circuits are such that zero mutual inductance occurs between the cage conductors and the position control windings. This arrangement allows for a substantially small delay in the phase between a current in the position control windings and an electromotive force. Also, the current barely flows from the position control windings into the rotor windings. This effectively prevents generation of heat in the rotor.

The retainer rings are so rigid that the end rings may withstand a centrifugal force. The end rings can be rotated in an integral fashion without being subject to separation. The rotor can thus be rotated at higher speeds.

A torque which is exerted on the conductors is transmitted to the rotary shaft through the end rings. This more effectively produces a driving torque.

Further, each group of parallel conductors are short-circuited by the end rings. The rotor can have more slots with a lesser number of end rings. In other words, the rotor can be simple in structure and suffers less from slot ripple.

This arrangement also reduces space high harmonics, torque ripple and vibrations.

Finally, a single stator winding allows for radial and axial position control of the rotor.

What is claimed is:

1. An electromagnetic rotary machine driven by an electromagnetic induction between a stator and a rotor and having a magnetic bearing, the stator including a stator core and stator windings wound around the stator core to produce a torque for driving the rotor, and the rotor including a rotor core, the electromagnetic rotary machine comprising:

position control windings wound around the stator core for exerting at least one of a radial magnetic force and an axial magnetic force on the rotor for adjusting the position of the rotor in at least one of a radial direction and an axial direction, the number of poles of the position control windings being different from the number of poles of the stator windings; and cage conductors mounted to the rotor core and having end rings disposed at opposite ends of the cage conductors, the end rings being divided in one of a circumferential and an axial direction for connecting selected ones of the conductors to form a plurality of closed circuits;

wherein the number of poles of the closed circuits is set such that mutual inductance between the position control windings and the cage conductors is zero.

2. An electromagnetic rotary machine according to claim 1; wherein selected cage conductors are connected in plural four-pole closed circuits, the stator windings have four poles, and the position control windings have two poles.

3. An electromagnetic rotary machine according to claim 1; wherein selected cage conductors are connected in plural two-pole closed circuits, the stator windings have two poles, and the position control windings have four poles.

4. An electromagnetic rotary machine according to claim 1; wherein the end rings are divided in a circumferential direction so as to form the closed circuits and are interconnected by annular retainer rings.

5. An electromagnetic rotary machine according to claim 1; wherein the rotor includes a rotary shaft and the end rings are divided in an axial direction and are mounted directly onto the rotary shaft.

6. An electromagnetic rotary machine according to claim 1; wherein the cage conductors have magnetic poles formed by a plurality of parallel conductors.

7. An electromagnetic rotary machine according to claim 1; wherein the rotor core is skewed.

8. An electromagnetic rotary machine according to claim 1; wherein the rotor core and the stator core have axially inclined peripheral surfaces and the position control windings exert an axial magnetic force on the rotor.

9. An electromagnetic rotary machine according to claim 1; wherein the rotor core has ends axially offset from ends of the stator core and the position control windings exert an axial magnetic force on the rotor.

10. An electromagnetic rotating machine driven by an electromagnetic action between a stator and a rotor, the machine comprising: a stator having one or more drive windings for generating a rotating magnetic field for rotatably driving the rotor; one or more position control windings fitted to the stator for generating a magnetic field having a different number of poles than that of the one or more drive windings, whereby a magnetic force acts on the rotor by supplying one or more of the position control windings with an electric current sufficient to unbalance the magnetic field applied to the rotor by the drive windings so as to control at least one of the axial and radial position of the rotor within the stator; and a plurality of cage conductors selectively interconnected to form a plurality of closed circuits mounted to the rotor, the closed circuits having a number of poles set so that there is no mutual inductance between the position control windings and the cage conductors when the rotor is centrally disposed within the stator.

11. An electromagnetic rotating machine according to claim 10; further comprising end rings for connecting the cage conductors in the plurality of closed circuits, and a retaining ring for rigidly connecting the end rings to each other, wherein the end rings each comprise a conductive material having an arcuate shape provided with slots for receiving selected cage conductors which are to be short-circuited to each other to form the closed circuits and an arcuate recess for receiving the retaining ring, and wherein a plurality of end caps equal to the number of closed circuits is arranged at each end of the rotor for receiving the cage conductors to be short circuited to each other to form the closed circuits.

12. An electromagnetic rotating machine according to claim 10; further comprising end rings for connecting the cage conductors in the plurality of closed circuits, and wherein the rotor comprises a shaft extending through the stator, the end rings each comprise a conductive material provided with slots for receiving selected cage conductors which are to be short circuited to each other to form the closed circuits, and a plurality of end caps equal to the number of closed circuits are rigidly connected to the shaft for receiving the cage conductors to be short circuited to each other to form the closed circuits.

13. An electromagnetic rotating machine according to claim 10; wherein the cage conductors comprise four-pole closed circuits, the drive windings have four poles, and the position control windings have two poles.

14. An electromagnetic rotating machine according to claim 10; wherein the cage conductors comprise two-pole closed circuits, the drive windings have two poles and the position control windings have four poles.

15. An electromagnetic rotating machine according to claim 10; wherein the cage conductors have magnetic poles formed by a plurality of parallel conductors.

16. An electromagnetic rotating machine according to claim 10; wherein the rotor core is skewed.

17. An electromagnetic rotating machine according to claim 10; wherein the rotor and the stator have axially inclined peripheral surfaces and the position control windings exert an axial magnetic force on the rotor.

18. An electromagnetic rotating machine according to claim 10; wherein the rotor has ends axially offset from ends of the stator and the position control windings exert an axial magnetic force on the rotor.

\* \* \* \* \*